A. WOLLENSAK.
FILM HOLDER.
APPLICATION FILED OCT. 17, 1917.

1,285,539.

Patented Nov. 19, 1918.

INVENTOR:
Andrew Wollensak
by Lewis V Timms
his attorneys

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION.

FILM-HOLDER.

1,285,539.  Specification of Letters Patent.  Patented Nov. 19, 1918.

Application filed October 17, 1917. Serial No. 197,147.

*To all whom it may concern:*

Be it known that I, ANDREW WOLLENSAK, a citizen of the United States, and resident of Rochester, in the county of Monroe and State of New York, have invented certain new and useful Improvements in Film-Holders, of which the following is a specification.

This invention relates to film holders, and more particularly to those which are adapted to receive an untreated film and to be placed, with the film in position, in a suitable receptacle, wherein fluid-treatment of the film may be accomplished, an object of the invention being to produce a structure of this character that may be readily manipulated and cheaply built. Another object is to provide for so supporting the film that all parts thereof will be freely exposed to the developer or other fluid. Still another object of the invention is to provide a structure which will permit the film to be compactly housed in a small receptacle.

To these and other ends the invention consists of certain parts and combinations of parts all of which will be hereinafter described, the novel features being pointed out in the appended claims.

In the drawings:—

Figure 1:
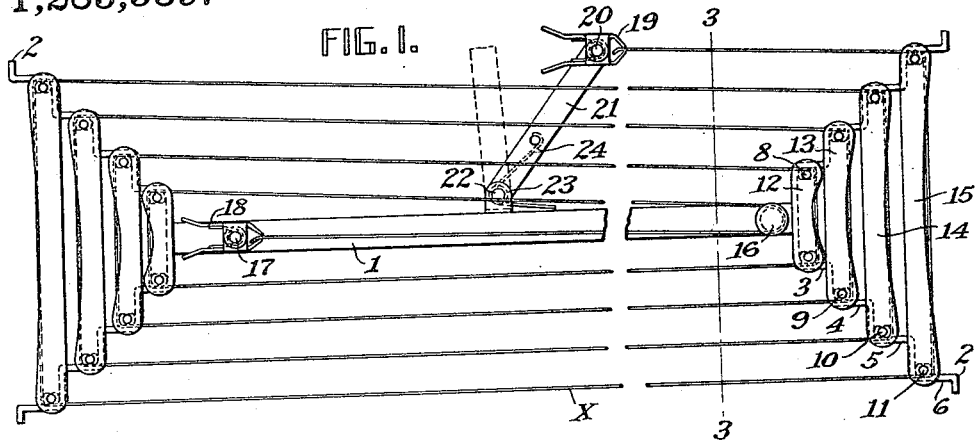
Figure 1 is a top plan view of a film holder constructed in accordance with this invention, with a film thereon.

In the embodiment of the film holder as shown herein there is provided a longitudinal frame 1, which in the present instance is in the form of a square bar having at each end a member or bar 2 of metal bent to provide a series of steps or offsets 3, 4, 5 and 6. In each pair of steps is mounted, preferably on pivots or screw-pins 7, a film support, said supports in the present instance comprising parallel rods or bars 8, 9, 10 and 11, respectively, coupled at their other ends by flat connectors 12, 13, 14 and 15, that may be fixed to the rods in any suitable manner. These supports are arranged so as to swing from the upright position shown in Figs. 1 and 2 to the flat or depressed position of Fig. 4. In the latter position the supports may lie in the same plane as the frame 1. It will be noted that the supports are of progressively-increasing widths, those farthest from the frame 1 being the widest. This arrangement permits each frame to house or inclose another frame when they are thrown to the positions shown in Fig. 4.

Near one end of the frame 1 is a fixed post 16, and near the other end of said frame is another fixed post 17 on which is mounted a film engaging device, such as a spring clip 18, that is particularly adapted to grasp one end of a film. A device is provided for engaging the other end of the film, and this may be a spring clip 19, similar to the clip 18. In the present instance this clip 19 is shown as mounted on a post 20, this post being set in the end of an arm or lever 21 that is pivoted at 22 in a bracket 23. A spring 24 is arranged so as to have a constant tendency to throw the arm 21 toward the position indicated in broken lines in Fig. 1 in order to place the film under tension.

Figure 2:
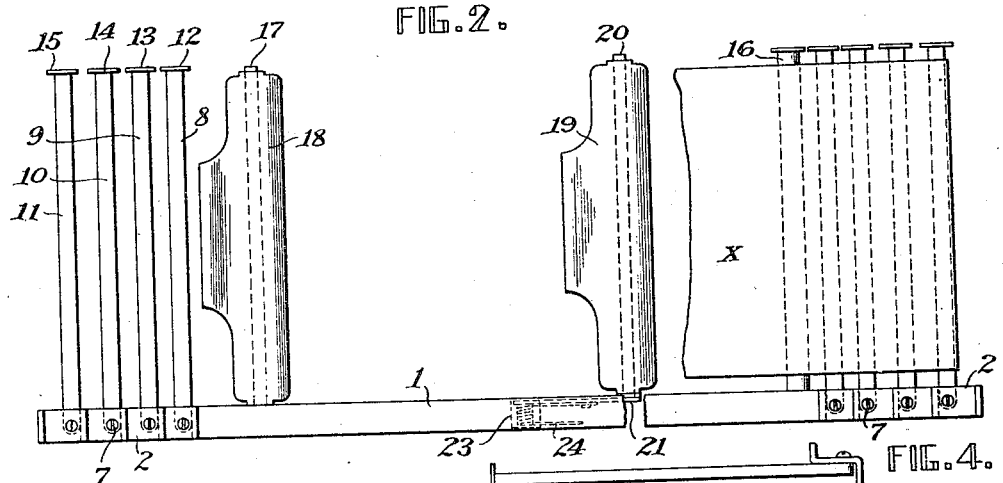
Fig. 2 is a side elevation of the device, a part of the film being omitted.
Figure 3:
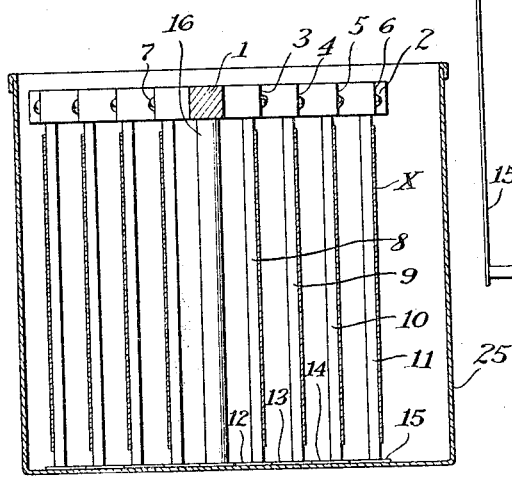
Fig. 3 is a section on the line 3—3, Fig. 1, showing the device set in a fluid container.
Figure 4:
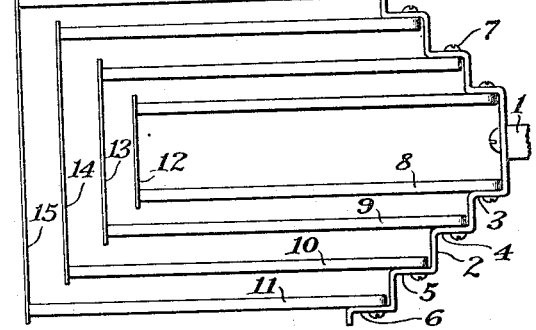
Fig. 4 is a top plan of a portion of the device in another position.

The manner of using the film holder when constructed as above described is as follows:

The supports 8, 9, 10 and 11 are first turned on their pivots so that they extend in the same plane as the frame 1, as shown in Fig. 4. One end of the strip of film X is then secured by the clip 18, and the film is carried to and turned around the post 16. The support 8 on the left-hand end of the frame 1 is then swung upwardly about its pivot until it stops against the frame 2. The film is then carried from the post 16 around this support 8 with the coated side outermost, and the support 8 on the right-hand end of the frame 1 is then similarly set upright and the film is passed around it, as shown in Fig. 1. The support 9 at the left is then set upright, then the support 9 at the right, and the others are erected in similar succession until finally the film is passed around outside of the support 11 at the right-hand end of the frame 1. The arm 21 is then swung toward the right against the pressure of the spring 24 as far as may be necessary, in order that the remaining end of the film may be secured by the clip 19. The spring 24 then moves the arm 21 toward the left, thereby taking up all slack in the film strip, so that each stretch of film between opposite supports is clear of the adjacent stretches of film. The whole structure may then be inverted and placed within a suitable fluid container, such as the tank 25 (Fig. 3), for fluid-treatment of the film.

It will be noted that the film supports are all of the same length, so that the connectors 12, 13, 14 and 15 all lie in the same plane when the supports are erected. These connectors then rest uniformly on the bottom of the tank 25 when the holder is inverted, and form a steady rest for the device. The ends of the bar 2 act to space the film from the sides of the container.

It is possible to handle film strips of different lengths with this device, if only those supports actually needed are brought into use to carry the film, the others merely being erected and remaining empty.

From the foregoing it will be seen that there has been provided a film holder having two series of film supports of progressively-increasing widths thereon, and means for holding a film on these supports under tension.

What I claim as my invention and desire to secure by Letters Patent is:—

1. A film holder comprising two oppositely-disposed series of film supports each formed by a rigid frame, the frames of each series progressively increasing in width and being independently movable 2. A film holder comprising two oppositely-disposed series of film supports, each including a pair of rigidly connected bars; the distance between the bars of each of the supports of each series progressively increasing; and the supports being separately movable to and from film-receiving position, and means for engaging opposite ends of a film for holding said film in contact with said supports.

3. A film holder comprising two oppositely-disposed series of film supports each formed by a rigid frame, said frames being arranged in spaced relation and each support of each series being of a different width and independently movable, the narrowest support of one series being nearest to the narrowest support of the other series.

4. A film holder comprising a bar, two series of oppositely-disposed steps at opposite ends of the bar, and two series of frames, the members of each series having different widths and being independently pivoted to the steps, each of said frames including two bars and a rigid connection between the bars.

5. A film holder comprising a plurality of supports about which the film is wrapped with its convolutions spaced from each other, and two clamps, one for securing the inner end of the film and the other for securing the outer end of the film, one of said clamps being under spring tension to place the film under tension on the supports.

6. A film holder comprising a frame, a series of film supports the members of the series progressively increasing in width at each end of said frame, and two clamps, one for securing the inner end of a film passed around the supports and the other for securing the outer end of the film, one of said clamps being under spring tension in order to place the film under tension on the supports.

7. A film holder comprising a longitudinal frame, two series of oppositely-disposed steps on said frame, film supports of different widths movably mounted on said steps, and means for holding a film under tension about said supports.

8. A film holder comprising two series of film supports the members of each series being of different widths and independently movable, means engaging one end of a film passed about the supports, and a spring-operated member provided with means for engaging the other end of the film.

ANDREW WOLLENSAK.

Copies of this patent may be obtained for five cents each, by addressing the "Commissioner of Patents, Washington, D. C."